United States Patent [19]

Bauer

[11] Patent Number: 4,504,777
[45] Date of Patent: Mar. 12, 1985

[54] CONTROL CIRCUIT FOR HOLDING CONSTANT THE OPERATING VOLTAGE OF AN ELECTRIC LOAD

[75] Inventor: Anton Bauer, Kelkheim, Fed. Rep. of Germany

[73] Assignee: Braun Aktiengesellschaft, Kronberg, Fed. Rep. of Germany

[21] Appl. No.: 449,710

[22] Filed: Dec. 14, 1982

[30] Foreign Application Priority Data

Dec. 14, 1981 [DE] Fed. Rep. of Germany ....... 3149447

[51] Int. Cl.³ ............................................. G05F 5/00
[52] U.S. Cl. ................................... 323/300; 323/242; 323/288; 363/85
[58] Field of Search ............... 323/242, 243, 282, 300, 323/237, 288; 363/86, 85

[56] References Cited

U.S. PATENT DOCUMENTS

| | | | |
|---|---|---|---|
| 3,241,044 | 3/1966 | Mills | 323/237 |
| 3,353,082 | 11/1967 | Mellott et al. | 321/16 |
| 3,412,314 | 11/1968 | Crane | 321/16 |
| 3,497,794 | 2/1970 | Fredrickson et al. | 323/282 |
| 3,733,535 | 5/1973 | Ballman | 323/282 |
| 3,783,367 | 1/1974 | Yamamoto et al. | 321/11 |

FOREIGN PATENT DOCUMENTS

| | | |
|---|---|---|
| 1275190 | 1/1964 | Fed. Rep. of Germany. |
| 2030152 | 6/1970 | Fed. Rep. of Germany. |
| 85361 | 7/1978 | Japan .................................. 323/282 |

OTHER PUBLICATIONS

"Controlled Rectifiers in Stabilized Power Supplies", Wireless World, Oct. 1963, F. Butler, pp. 3452–3457.
Publication of E. Flamig and W. Witke of Dresden, entitled "Eigenschaften von Thyristorstellgliedern", pp. 695 & 696.

Primary Examiner—William H. Beha, Jr.
Attorney, Agent, or Firm—Raymond J. De Vellis

[57] ABSTRACT

A control circuit for supplying a relatively constant operating voltage to an electrical load over a relatively wide range of supply line voltages, including an electronic switch connected in series with the electrical load and having a control lead, a reference voltage generating element, and a comparator for receiving the reference voltage and a voltage representative of the actual voltage applied to the electrical load and for generating and electrical signal which is applied to the control lead of the electronic switch.

9 Claims, 2 Drawing Figures

CONTROL CIRCUIT FOR HOLDING CONSTANT THE OPERATING VOLTAGE OF AN ELECTRIC LOAD

BACKGROUND OF THE INVENTION

1. Field of the Invention

The present invention relates to a control circuit for holding constant the operating voltage of an electronic load that can be operated at different line voltages, with an electronic switch that is controlled by the phase angle and that is connected in series with the load.

2. Description of the Prior Art

It is known that electronic loads, especially small electric appliances, can be connected to different line voltages in the range of, for example, 100 to 240 volts AC, by using a so-called phase-angle control, without the electric loads being adjusted for the particular line voltage by a corresponding switchover mechanism.

Phase-angle controls as such have also been used to control the brightness of electric incandescent lamps. In such a case, a time constant or a phase bridge for the time shift of the ignition voltage of a phase-angle controllable electronic switch is changed by means of a variable resistor. Transistors, thyristors, or triacs are generally used as the phase-angle controllable switch.

SUMMARY OF THE INVENTION

The purpose of the present invention is to create a control circuit for holding constant the operating voltage of an electric load that can be operated at different line voltages, by using an electronic switch that can be controlled through the phase angle. The present invention prevents erroneous switching, which can cause the destruction of the electric load, and also achieves a reliable overvoltage protection for the electric load.

According to the invention, this purpose is achieved by the actual value of the voltage, which is present at the load, being compared with a theoretical value that is tapped from a reference element, and being conducted to a comparator element which is connected to the control terminal of the electronic switch that is controllable through the phase angle.

The solution according to the invention makes it possible to operate an arbitrary electric appliance at operating voltages variable over a wide range, without a voltage changeover being required to the particular operating voltage that is present at the time. Thus, the risk of erroneous switching of the voltage selector by the user is eliminated and, in addition, a reliable low voltage protection is guaranteed if the operating voltages should rise.

In one embodiment the actual value of the voltage which is present at the load is integrated in comparison with the theoretical value that is tapped at the reference element. In this regard, a series circuit consisting of a capacitor and of the first resistor is connected in parallel to the load. The connection of the first resistor is connected with the capacitor and with the emitter of a transistor that serves as a comparison element. The base of the transistor is connected to the anode of a zener diode which serves as a reference element and which is connected in series with a second resistor in parallel to the load voltage. The collector of the transistor is connected to a second capacitor, which is connected in parallel to the control terminal cathode line of a thyristor which in turn is connected in series with the load and is connected thereto on the anode side, whereby the cathode of the thyristor is connected with the negative terminal of the line voltage.

This circuit is particularly inexpensive and provides a good comparison between the voltage existing at the comparison element and at the load. It can be used for a large number of applications with high reliability.

In another embodiment, the actual value of the voltage which is present at the load is composed of the difference of the average value of the operating voltage and the average value of the voltage that is present at the electronic switch which is controllable by the phase angle. To this end, the emitter of the transistor, which serves as comparison element, is connected, on the one hand, via a first resistor, to the connection of the electric load with the electronic switch that is controllable through the phase angle and, on the other hand, to a capacitor that is in turn connected with the negative terminal of the voltage source. The collector of the transistor is connected with the control terminal of the electronic switch, and the base of the transistor is connected with the anode of a zener diode which serves as a reference element. The cathode of the zener diode is connected through a resistor with the positive pole of the voltage source and is also connected, through a further capacitor, with the negative pole of the voltage source. Additionally, in parallel with the first resistor, there is provided a series circuit of a second resistor and of a diode that is connected on the cathode side with the load.

Such a circuit is quite reliable. Even if the phase-angle control is very large, it makes possible a good comparison between the voltage present at the reference element and the voltage which is applied to the load. Through the combination of sensing the arithmetic mean and the peak value of the voltage, a good approximation is achieved to the true rms value of the operating voltage.

BRIEF DESCRIPTION OF THE DRAWINGS

These and other features of the present invention will be explained by way of a description of preferred embodiments, reference being had to the accompanying drawings, wherein.

DESCRIPTION OF THE PREFERRED EMBODIMENTS

Figure 1:
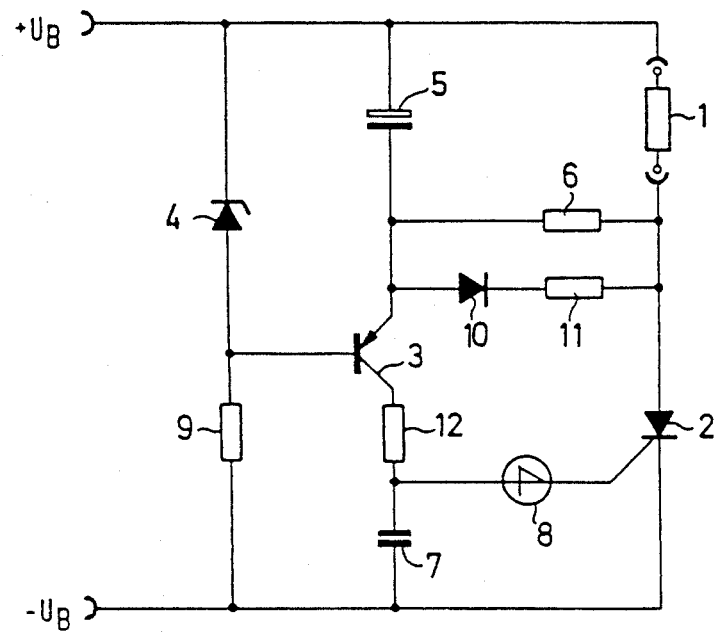
FIG. 1 is a schematic diagram of a control circuit diagram for holding constant the operating voltage of an electric load, where the arithmetic mean of the operating voltage is given as a comparison voltage.

Referring to FIG. 1, the power section of an electric appliance is connected in series to an arbitrary AC voltage source $\pm U_B$. The electric appliance includes an electric load 1 and an electronic switch 2 connected in series thereto. The line voltage $\pm U_B$ can assume values between 100 and 240 volts in the usual manner. In FIG. 1, a positive and negative pole has been assumed for the voltage source to simplify the representation. In actual devices, this is usually implemented by connecting a rectifier circuit between the device and the AC power line. In parallel to the electric load 1, there is connected a series circuit of a capacitor 5 and a first resistor 6. The connection of first resistor 6 with the capacitor 5 is connected with the emitter of a transistor 3 which serves as a comparison element. The base of transistor 3 is connected with the junction of the anode of a zener diode 4, which serves as a reference element, and a resistor 9. These are connected in series, across the AC line voltage source $\pm U_B$. The collector of the transistor 3, which serves as a comparison element, is connected, through a resistor 12 and another capacitor 7, to the negative pole of the voltage source. A trigger diode 8 is connected to the junction of resistor 12 and capacitor 7 on the one hand and to the control connection of the electronic switch 2 on the other hand. Finally, in parallel to the first resistor 6, there is connected a series circuit consisting of a diode 10 and a second resistor 11. The anode of the diode 10 is connected with the emitter of transistor 3, which serves as comparison element.

In the embodiment of FIG. 1, the actual value of the voltage which is present at the electric load is used to make a comparison with a theoretical voltage value. In this embodiment, the zener diode 4 is used as a comparison element. Through the resistor 9, a current flows through the zener diode 4 from the minus terminal of the control circuit. If the emitter of the transistor 3, which serves as comparison element, is raised, through the voltage present at the electric load 1, above the base voltage, which is held constant by means of the zener diode 4, minus the voltage drop at the base-emitter line of transistor 3, the collector current of transistor 3 with decline. As a result, the charging time constant of the firing capacitor 7 in series with the resistor 12 is increased, and thus the ignition time of the electronic switch 2 is delayed, whereby a further rise of the load voltage is prevented. On the other hand, if the load voltage drops, the collector current rises as a consequence of the base voltage of transistor 3 being held constant, the firing capacitor 7 receives a larger current through the resistor 12, so that the voltage which is present at the connection point of the resistance 12 with the firing capacitor 7, and which rises with the charging of the firing capacitor 7, reaches the breakthrough voltage of the trigger diode 8 earlier, and thus activates the electronic switch 2 at an earlier time. With the earlier activation of the electronic switch 2, a larger voltage-time area is applied to the load and thus a larger rms value of the operating voltage is applied to the electric load 1.

To ensure a smooth voltage in the control region, the voltage present at the load 1 is filtered through a low-pass filter, consisting of resistor 6 and capacitor 5. The voltage at capacitor 5, however, represents an arithmetic mean of the load voltage, while the mean square value or the rms value of the applied voltage is relevant for the load power itself.

If, in the usual manner, one assumes for a sinusoidal voltage or for a sinusoidal current that the peak voltage value or the peak current value is unity, then the arithmetic mean for full-wave electrification is 0.637 to $2/\pi$, and the rms value is 0.707 to $1/\sqrt{2}$. As the flow times per period decline, however, the difference between the arithmetic mean and the mean square or rms value increases. If the line voltage lies near the upper limit, only a small portion of the half waves is still switched in as a consequence of the control. Under these circumstances, the rms value can exceed the arithmetic mean by a factor of 2 to 2.5. A control which is designed for a voltage which remains the same at the filter capacitor 5, would thus simulate too high an rms value of the device voltage or too high an actual value of the voltage when the line voltage is high.

In order to overcome this source of error, it is known that thermotransformers or the like can be used. However, in general, the added expense is not economically reasonable for the production of consumer devices in the electrical industry.

A good approximation to the true rms value is provided by a combination of sennsing the arithmetic mean and the peak value. As the switch-off time increases, the peak value rises more rapidly compared to the arithmetic mean than the rms value. To this end, in the circuit according to FIG. 1, the series circuit of diode 10 and resistor 11 is provided in parallel to the first resistor 6. By means of this series circuit in parallel to resistor 6, the excess elevation of the peak value can be reduced to such an extent that, over the entire regulation range, the voltage present at the capacitor 5 deviates only slightly from the rms value of the voltage at the electrical load 1. Inasmuch as an inductive component exists in the load, and thus the reactance comes larger with increasing switch-off time, the sensing of the peak value by the series resistor 11 is to be correspondingly attenuated. With a large inductive component, the sensing of the arithmetic mean by itself can fully suffice.

The comparison voltages that are tapped at the zener diode 4 and the capacitor 5 are referred to the positive pole of the voltage source $+U_B$. It is therefore possible that these voltages will become negative with respect to the negative pole of the voltage source in the region of the zero crossings of the operating voltage. If the electronic switch 2 is controlled over a large phase angle, the charge current for firing capacitor 7 is then interrupted and firing is omitted for one or more half waves. In order to eliminate this possible source of error, a variant of the solution according to the invention has been developed as shown in FIG. 2.

Figure 2:
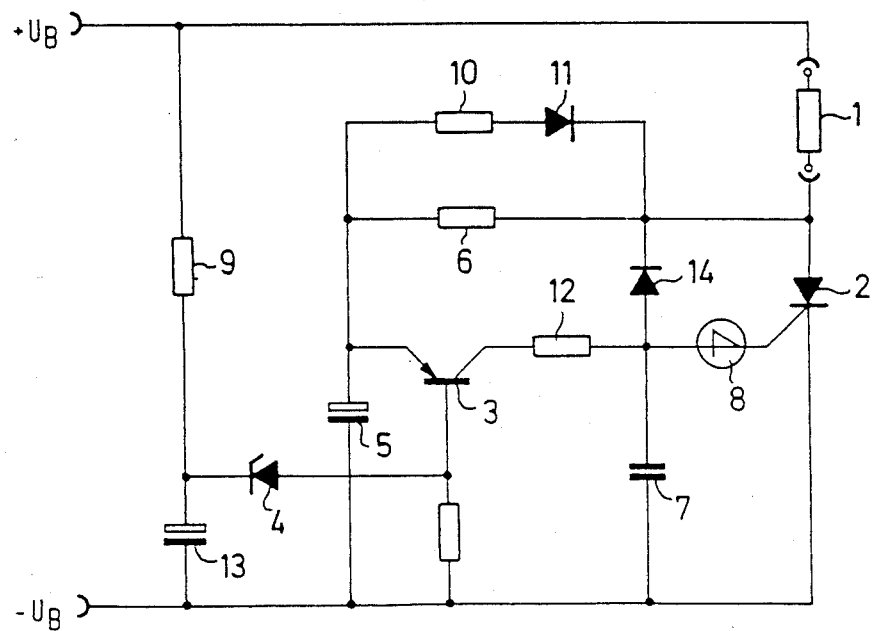
FIG. 2 is a schematic diagram of a control circuit diagram for holding constant the operating voltage of an electric load with a combination of sensing the arithmetic mean and the peak value of the operating voltage as a comparison voltage.

In the circuit arrangement according to FIG. 2, a series circuit consisting of an electric load 1 and an electronic switch 2, is likewise connected in parallel to a feeding AC voltage source $\pm U_B$. In this embodiment, the emitter of a transistor 3, which serves as a comparison element, is connected through a first resistor 6 to the junction of the electric load 1 and the electronic switch 2, which is controllable by the phase angle, and is also connected to a capacitor 5, which is in turn connected with the negative terminal of othe voltage source $-U_B$. The collector of the transistor 3 is connected with the control terminal of the electronic switch, while the base of the transistor 3 is connected with the anode of a zener diode which serves as reference element. The cathode of the zener diode 4 is connected through the resistor 9 to the positive pole of the voltage source $+U_B$, and is also connected through a capacitor 13 to the negative pole of the voltage source $-U_B$.

A diode 14 and a firing capacitor 7 are connected in series across electronic switch 2, with the cathode of the diode 14 being connected to the anode of the electronic switch 2 and the capacitor 7 being connected between the anode of the diode 14 and the cathode of the electronic switch 2. Additionally, in the circuit of FIG. 2, it is possible to connect a series circuit consisting of another resistor 10 with a diode 11, in parallel with the first resistor 6. The cathode of the diode 11 is then connected to the connection of the electrical load 1 with the anode of the thyristor 2.

The circuit of FIG. 2 effectively prevents the situation discussed above, wherein, when the thyristor 2 is blocked the charge current for the firing capacitor 7 is interrupted over a rather large phase angle, and thus firing is omitted for one or several half waves. For this purpose, both from the operating voltage and from the voltage present at the anode of the thyristor 2, an average value is formed at the capacitors 5 and 13, with respect to the minus terminal of the operating voltage $\pm U_B$. The difference of these voltage values corresponds to the actual value of the voltage at the electric load 1. The anode of diode 14 is connected with the firing capacitor 7 and the cathode of diode 14 is connected with the anode of the thyristor 2. The poling here is such that, when the thyristor 2 is blocked, the diode 14 is likewise blocked. However, when the thyristor 2 switches through, the diode 14 prevents renewed charging of the firing capacitor 7, which could otherwise occur after deactivation of the trigger diode 8. This results in better defined charging times and thus in a more uniform firing.

Considering the embodiments discussed above, further variants are also possible to form the actual and theoretical values of the operating voltages which are present at the comparison element. Accordingly, while the invention has been described by way of a number of preferred embodiments, substitution of equivalents may be effected by one of ordinary skill in the art which do not depart from the spirit or scope of the invention as set forth in the following claims.

What is claimed as new and desired to be secured by Letters Patent of the United States is:

1. A control circuit for receiving a relatively wide range of supply line voltages from positive and negative voltage supply terminals and for supplying therefrom a relatively constant operating voltage to an electrical load, comprising;
   an electronic switch having an anode, a cathode and a control terminal cathode line, said anode of said electronic switch being connected to said electrical load to form a series circuit connected across said voltage supply terminals;
   reference voltage generating means for generating a substantially constant reference voltage;
   a first resistor connected in series with said reference voltage generating means across said voltage supply terminals;
   a first capacitor and a second resistor connected in series across said electrical load;
   a transistor having an emitter connected to the junction of said first capacitor and second resistor, a base connected to the junction of said reference voltage generating means and said first resistor, and a collector connected to said control terminal cathode line of said electronic switch; and
   a second capacitor connected between said collector of said transistor and said negative voltage supply terminal.

2. A control circuit as in claim 1, further comprising a diode and a third resistor connected to form a series circuit in parallel with said second resistor, the anode of said diode being connected to the emitter of said transistor.

3. A control circuit as in claim 2, further comprising a trigger diode connected between said collector of said transistor and said control terminal of said electronic switch.

4. A control circuit as in claim 1, wherein said reference voltage generating means is a Zener diode having a cathode connected to the positive voltage supply terminal and an anode connected to said base of said transistor.

5. A control circuit for receiving a relatively wide range of supply line voltages from positive and negative voltage supply terminals and for supplying therefrom a relatively constant operating voltage to an electrical load, comprising;
   a phase-angle controllable electronic switch having an anode, a cathode and a control terminal, said anode of said phase-angle controllable electronic switch being connected to said electrical load to form a series circuit connected across said voltage supply terminals;
   a first capacitor and a first resistor connected in series across said voltge supply terminals;
   a transistor having a base connected to said negative voltage supply terminal, a collector connected to said control terminal of electronic switch and an emitter;
   a second resistor connected between said emitter of said transistor and said anode of said electronic switch;
   a second capacitor connected between said emitter of said transistor and said negative voltage supply terminal; and
   a reference voltage generating a substantially constant reference voltage, said reference voltage generating means being connected between the base of said transistor and the junction of said first capacitor and said first resistor.

6. A control circuit as in claim 5, further comprising a first diode and a third resistor connected in series across said second resistor, the cathode of said first diode being connected to the anode of said electronic switch.

7. A control circuit as in claim 6, further comprising a second diode and a third capacitor connected in series between said anode of said electronic switch and said negative voltage supply terminal, with the cathode of said second diode being connected to the anode of said electronic switch.

8. A control circuit according to claim 7, further compirsing a trigger diode connected between said collector of said transistor and said control terminal of said electronic switch.

9. A control circuit as in claim 5, wherein said reference voltage generating means is a Zener diode having an anode connected to the base of said transistor and a cathode connected to the junction of said first capacitor and said first resistor.

* * * * *